US012589564B2

(12) United States Patent
Stutz et al.

(10) Patent No.: US 12,589,564 B2
(45) Date of Patent: Mar. 31, 2026

(54) MOLD UNIT FOR MOLDING OPHTHALMIC LENSES

(71) Applicant: ALCON INC., Fribourg (CH)

(72) Inventors: Michael Stutz, Kleinwallstadt (DE);
Jan Bernard, Niedernberg (DE);
Giovanni Campanelli, Grosswallstadt
(DE); Lukas Lomb, Aschaffenburg
(DE); Matthias Schwab, Amorbach
(DE)

(73) Assignee: Alcon Inc., Fribourg (CH)

( * ) Notice: Subject to any disclaimer, the term of this
patent is extended or adjusted under 35
U.S.C. 154(b) by 330 days.

(21) Appl. No.: 17/455,139

(22) Filed: Nov. 16, 2021

(65) Prior Publication Data

US 2022/0152958 A1      May 19, 2022

Related U.S. Application Data

(60) Provisional application No. 63/114,680, filed on Nov.
17, 2020.

(51) Int. Cl.
  *B29C 64/00*       (2017.01)
  *B29D 11/00*       (2006.01)
(52) U.S. Cl.
  CPC ................................ *B29D 11/0048* (2013.01)
(58) Field of Classification Search
  None
  See application file for complete search history.

(56) References Cited

U.S. PATENT DOCUMENTS

| | | | | |
|---|---|---|---|---|
| 5,456,864 A | * | 10/1995 | Wickes .............. | B29D 11/0048 |
| | | | | 264/2.7 |
| 6,543,984 B1 | * | 4/2003 | Hovey .............. | B29D 11/0024 |
| | | | | 414/816 |
| 6,669,460 B1 | * | 12/2003 | Tai ................... | B29D 11/00442 |
| | | | | 425/808 |
| 6,739,569 B2 | * | 5/2004 | Bickert ............ | B29D 11/00432 |
| | | | | 425/808 |
| 2003/0178862 A1 | * | 9/2003 | Hagmann .......... | B29D 11/0024 |
| | | | | 294/188 |
| 2009/0289383 A1 | | 11/2009 | Lawton et al. | |

FOREIGN PATENT DOCUMENTS

| | | | | |
|---|---|---|---|---|
| WO | 0046016 A1 | 8/2000 | | |
| WO | WO-2015078798 A1 | * | 6/2015 | ........... B29C 33/306 |

* cited by examiner

*Primary Examiner* — Nicholas Krasnow
(74) *Attorney, Agent, or Firm* — Sheng-Hsin Hu

(57) ABSTRACT

A mold unit for molding ophthalmic lenses comprises:
  A) an adapter piece comprising an opening extending
  around a longitudinal axis; B) a sleeve fixedly con-
  nected to the adapter piece and extending through the
  opening of the adapter piece; C) a lens mold rigidly
  mounted to the sleeve; D) an adjustment ring firmly
  attached to the sleeve to circumferentially surround a
  portion of the sleeve. The adjustment ring comprises a
  flat circular outer engagement surface, and the adapter
  piece comprises at least one clamping block having a
  flat inner clamping surface. The flat inner clamping
  surface frictionally clamps the flat circular outer
  engagement surface to prevent inadvertent rotation of
  the sleeve relative to the adapter piece) but to allow
  rotation of the sleeve relative to the adapter piece upon
  the application of a torque higher than a predetermined
  threshold torque.

11 Claims, 10 Drawing Sheets

1    10    100

112

11

1110

11

110

111 z
y
x

MOLD UNIT FOR MOLDING OPHTHALMIC LENSES

PRIORITY CLAIM

This application claims the benefit of priority of U.S. Provisional Patent Application Ser. No. 63/114,680 titled "MOLD UNIT FOR MOLDING OPHTHALMIC LENSES," filed on Nov. 17, 2020, whose inventors are Michael Stutz, Jan Bernard, Giovanni Campanelli, Lukas Lomb and Matthias Schwab, which is hereby incorporated by reference in its entirety as though fully and completely set forth herein.

FIELD

The invention relates to the manufacture of ophthalmic lenses, in particular contact lenses such as soft contact lenses. More specifically, the invention relates to a mold unit for molding ophthalmic lenses, in particular contact lenses such as soft contact lenses having surfaces that are not rotationally symmetrical (e.g. toric).

BACKGROUND

Ophthalmic lenses such as contact lenses, and in particular soft contact lenses for single use, may be produced in an automatic lens manufacturing process in automatic lens manufacturing lines using re-usable glass molds. In such automatic lens manufacturing lines, the contact lenses are typically formed using glass molds comprising male and female molds. In the following, the terms 'mold' or 'molds' are used to include or denote a 'mold half' or 'mold halves' unless the specification dictates otherwise. A flowable lens forming material is dispensed into one of the molds, for example into the female mold, and the male and female molds are then mated to enclose the lens forming material between the molding surfaces of the male and female molds to define the shape of the contact lens. Thereafter, the lens forming material contained in a cavity formed between the molding surfaces is cured to form the contact lens, the molds are opened and the contact lens is removed from the male or female mold for further processing. The glass molds used for the manufacture of the contact lens are subsequently cleaned, rinsed and dried and are re-used in the next production cycle again.

The individual manufacturing steps of the automatic lens manufacturing process are carried out at various different process stations in such automatic manufacturing line, and each of the individual manufacturing steps is concurrently carried out in a process station for a plurality of contact lenses to be manufactured. For example, lens forming material is dispensed into a plurality of molds at the same time, the plurality of molds are then transported to a process station where the plurality of male and female molds are concurrently mated, the plurality of mated molds are then transported together to a curing station where the lens forming material contained in the cavity formed between the molding surfaces of the plurality of mated molds is cured, and so on.

During mating of the male and female molds, the male and female molds must be properly aligned relative to each other in order to make sure the cavity formed between the molding surfaces of the mated male and female molds (corresponding in shape to the contact lens to be formed) has the desired geometry. To provide for proper alignment of the male and female molds, the male and female molds are fixedly mounted in sleeves axially extending beyond the molding surfaces of the molds. During mating of the male and female molds, the sleeves are moved towards each other until they come into telescopic engagement. Once the sleeves are in telescopic engagement they are further moved towards each other until the male and female molds are arranged in a final position relative to each other in which the cavity formed between the molding surfaces defines the geometry of the contact lens to be formed (with lens forming material being contained in the cavity).

As indicated, the individual manufacturing steps of the automatic lens manufacturing process are concurrently carried out in each process station for a plurality of contact lenses to be manufactured. To achieve this, lens mold carriers are used each carrying a plurality of lens molds of the same type (i.e. either male molds or female molds). For example, lens mold carriers carrying fourteen male molds or fourteen female molds, respectively, may be used. Such lens mold carriers are known, for example, from WO 2015/078798. When using such lens mold carriers in the manufacture of contact lenses, in a dispensing station of the automatic lens manufacturing line lens forming material is concurrently dispensed into all female molds arranged in one such lens mold carrier, and in a mating station the male molds arranged in a respective lens mold carrier are mated with the female molds of the lens mold carrier into which the lens forming material has been dispensed. After mating, the molds are closed by further moving the lens mold carrier carrying the male molds towards the lens mold carrier carrying the female molds until the male and female molds are in the final position relative to each other in which the cavities formed between the molding surfaces define the geometry of the contact lenses to be formed. This closing movement is guided by the telescopic engagement of the sleeves. Once the molds are closed, the lens mold carriers with the closed molds are transported to a curing station in which curing of the lens forming material contained in the cavities of the closed molds is concurrently performed for all closed molds of the carriers. Once the lens forming material has been cured to form contact lenses, the lens mold carrier carrying the male molds is removed from the lens mold carrier carrying the female molds, thus concurrently opening the molds. The contact lenses so formed are then removed for further processing.

The lens mold carrier disclosed in WO 2015/078798 comprises a frame with fourteen compartments in which male and female mold units are arranged, respectively. Each male mold unit and female mold unit comprises an adapter piece and a sleeve rigidly mounted to the adapter piece, with the male or female mold being rigidly arranged in the sleeve, respectively. Each adapter piece of the respective male or female mold unit is floatingly arranged in the respective compartment of the lens mold carrier, so that the whole male or female mold unit is allowed to translationally move in the plane of the lens mold carrier (i.e. in a horizontal plane) within the respective compartment of the lens mold carrier to a small extent. The floating arrangement of the adapter piece within the compartment of the lens mold carrier is important, as it allows the respective male and female mold unit to translationally move within the compartment during the process of mating the male and female molds in order to allow the sleeves to telescopically engage and axially align the male and female molds relative to each other.

It is further disclosed in WO 2015/078798 that the sleeve of the male mold unit comprises a toothed adjustment ring which is fixedly mounted to the sleeve of the male mold unit so that the adjustment ring can neither be axially moved nor be rotated relative to the sleeve (see, for example, FIG. 8-FIG. 10 of WO 2015/078798). The adapter piece of the male mold unit, on the other hand, is provided with fixedly arranged toothed locking elements engaging with the teeth of the adjustment ring fixedly mounted to the sleeve of the male mold unit. So in general, the sleeve with the male mold rigidly mounted to the sleeve is rotatable in angular steps corresponding to one tooth of the adjustment ring relative to the adapter piece in the same plane in which the adapter piece is translationally movable relative to the lens mold carrier. As the male mold is rigidly attached to the sleeve, the male mold is rotated together with the sleeve. This rotatability of the male mold is advantageous in the manufacture of contact lenses having a toric back surface, as it enables the manufacture of contact lenses having a toric back surface, and in particular it enables the manufacture of contact lenses having toric back surfaces with different angular arrangements of the axes of the toric back surface (the two axes of the toric back surface of a contact lens are typically arranged perpendicular relative to one another, but the overall arrangement of these two axes of the toric back surface can be changed by the afore-described rotation). It goes without saying that the front surface of such contact lens is not rotationally symmetrical either, but may comprise stabilization features (e.g. prism ballast, slab-off, etc.) rotationally stabilizing the contact lens on the eye and defining a reference axis, since without such stabilization features a toric back surface with axes arranged at different angles does not make sense.

As mentioned, in WO 2015/078798 it is possible to change the angular arrangements of the two axes of the toric back surface in angular steps corresponding to one tooth of the adjustment ring. The angular steps corresponding to one tooth of the adjustment ring is equal to 10° (degrees), so that is it possible to produce toric contact lenses with an arrangement of the axes of the toric back surface at 0°, 10°, 20°, 30°, . . . , up to 180°, by rotating the sleeve and the adjustment ring fixedly mounted thereto relative to the adapter piece.

While the manufacture of toric contact lenses using mold units as described in the afore-mentioned WO 2015/078798 generally works well, there is room for further improvement. For example, during the manufacture of toric lenses it may occur (in particular at angular arrangements of the axes different from 0°, 90° and) 180° that the angular arrangement of the axes of the toric back surface of the contact lenses deviates from the set angular arrangements of the axes of the male mold by an angular difference which may be in an absolute range of 1° to 3° (also depending on the amount of cylindrical correction of the toric lens). Without being bound to the following ranges, at set angular arrangements of the toric male mold of 10°, 20°, 30°, . . . , up to 80°, the deviation of the angular arrangement of the axes of the toric back surface of the contact lens from the set angular arrangement of the axes of the toric male mold may be in the range of +1° to +3°, whereas for set angular arrangements of the toric male mold of 100°, 110°, 120°, . . . , up to 170°, the deviation of the angular arrangement of the axes of the toric back surface of the contact lens from the set angular arrangement of the axes of the toric male mold may be in the range of −1° to −3°. While such deviations may appear small and tolerable at first glance, oftentimes they are not tolerable for the wearer of the contact lens having an astigmatic eye in need of accurate vision correction.

A further disadvantage is that set angular arrangements other than in steps of 10° (i.e. at 0°, 10°, 20°, 30°, . . . , up to) 180° cannot be manufactured using the afore-described molding units. This limits the range of toric contact lenses that can be supplied to the market, and contact lens wearers with astigmatic eyes having an angular arrangement of the axes other than 0°, 10°, 20°, 30°, . . . , up to 180° cannot be supplied with suitable toric contact lenses without accepting a vision correction that is not tolerable, or at least is not the optimal vision correction. It is therefore an object of the invention to overcome the afore-mentioned disadvantages.

SUMMARY

To achieve this object, the present invention suggests a mold unit for molding ophthalmic lenses, in particular contact lenses such as soft contact lenses. The mold unit comprises:

an adapter piece for insertion into a compartment of a lens mold carrier, the adapter piece comprising an opening extending around a longitudinal axis;

a sleeve fixedly connected to the adapter piece and extending along the longitudinal axis through the opening of the adapter piece;

a lens mold rigidly mounted to the sleeve; and an adjustment ring firmly attached to the sleeve and mounted to the sleeve in a manner such as to circumferentially surround a portion of the sleeve.

The adjustment ring comprises a flat circular outer engagement surface facing radially outwardly and extending in a circumferential direction around the sleeve.

The adapter piece comprises at least one clamping block having a flat inner clamping surface facing radially inwardly towards the flat circular outer engagement surface of the adjustment ring, the clamping block being arranged such that the flat inner clamping surface of the clamping block frictionally clamps the flat circular outer engagement surface of the adjustment ring so as to prevent inadvertent rotation of the sleeve relative to the adapter piece but to allow rotation of the sleeve relative to the adapter piece upon the application of a torque to the sleeve which is higher than a predetermined threshold torque.

According to one aspect of the mold unit according to the invention, the flat circular outer engagement surface of the adjustment ring and the flat inner clamping surface of the at least one clamping block may be configured such that the predetermined threshold torque is in the range of 0.3 Nm to 0.6 Nm, in particular in the range of 0.3 Nm to 0.4 Nm.

According to a further aspect of the mold unit according to the invention, the adapter piece may comprise two clamping blocks, each of the two clamping blocks having a flat inner clamping surface facing radially inwardly towards the flat circular outer engagement surface of the adjustment ring. The two clamping blocks may be symmetrically arranged relative to the longitudinal axis at radially opposite sides of the flat circular outer surface adjustment ring.

According to a further aspect of the mold unit according to the invention, the flat inner clamping surface of each of the two clamping blocks may be circular and may extend in the circumferential direction. The curvature of the flat circular inner clamping surface of each of the two clamping blocks may correspond to a curvature of the flat circular outer engagement surface of the adjustment ring. An inner diameter between the flat circular inner clamping surfaces of the two clamping blocks may be smaller than an outer diameter of the flat circular outer engagement surface of the adjustment ring.

According to still a further aspect of the mold unit according to the invention, the area of the flat circular inner clamping surface of each of the two clamping blocks may be in the range of 15 mm² to 25 mm², and in particular may be about 20 mm².

In accordance with yet a further aspect of the mold unit according to the invention, the adjustment ring may be composed of two ring parts which are assembled in a form-locked manner to form the adjustment ring.

In accordance with a further aspect of the mold unit according to the invention, the flat circular inner clamping surfaces are provided with a chamfer at an axial end thereof for simplifying introduction of the adjustment ring firmly mounted to the sleeve between the flat circular inner clamping surfaces of the two clamping blocks during assembly of the mold unit.

According to still a further aspect of the mold unit according to the invention, the clamping blocks may be made of polyoxymethylene, and the adjustment ring may be made of polyketone.

Yet in accordance with another aspect of the mold unit according to the invention, the inner diameter between the flat circular inner clamping surfaces of the two clamping blocks may be 0.6 mm-1.2 mm smaller than the outer diameter of the flat circular outer engagement surface of the adjustment ring.

According to a further aspect of the mold unit according to the invention, the lens mold may have a lens molding surface that is not rotationally symmetrical.

In accordance with still a further aspect of the mold unit according to the invention, the sleeve may comprise engagement surfaces for an adjustment tool for rotating the sleeve in the circumferential direction to a desired angular position.

Yet in accordance with a further aspect of the mold unit according to the invention, the lens mold rigidly mounted to the sleeve is a male mold having a toric lens molding surface.

The mold unit according to the invention is advantageous as it allows for an arrangement of the lens molds at any desired angular position. This is of particular advantage in cases in which at least one of the male or female molds has a lens molding surface that is not rotationally symmetrical, as this surface can be arranged at any desired angular position. For example, in the case of male or female molds (or both) having a lens molding surface that is not rotationally symmetrical, the invention allows to produce contact lenses providing optimal vision correction to patients having astigmatic eyes with axes arranged at angles different from 0°, 10°, 20°, 30°, . . . , up to 180°. However, the mold unit according to the invention may generally also be used with lens molds having a spherical lens molding surface (although in this case the arrangement of the molds at a particular angular position is not of relevance).

In addition, due to the flat clamping surface of the clamping block (which does not necessarily have to be circular) frictionally clamping the flat circular outer engagement surface of the adjustment ring over a larger surface (as opposed to the form-locking toothed engagement of the prior art), the deviations of the angular arrangement of the axes of the toric back surface of the contact lens from the set angular arrangement of the axes of the toric male mold are practically eliminated.

The clamping force between the flat inner clamping surface of the clamping block and the flat circular outer engagement surface of the adjustment ring is sufficiently strong to achieve a reliable fixation of the sleeve (and thus of the lens mold rigidly mounted thereto) at the set angular position during production in order to prevent inadvertent rotation of the sleeve relative to the adapter piece (to which it is connected), while at the same time it allows for a rotation of the sleeve upon the application of a torque to the sleeve which is higher than a predetermined threshold torque. The application of a torque higher than the threshold torque allows for rotation of the sleeve to a different set angular position relative to the adapter piece, and once this new set angular position has been reached (and application of the torque is terminated), the clamping force is again sufficient to achieve a reliable fixation of the sleeve (and thus of the lens mold rigidly mounted thereto) at the new set angular position. As will be explained in more detail below, this is possible while the mold unit remains mounted to the lens mold carrier, and with the lens mold carrier arranged on the production line (so that such change of the angular position can be performed in-line, i.e. during production).

While not intended to be limiting, an advantageous range for the predetermined threshold torque is 0.3 Nm to 0.6 Nm (Newton meters), in particular 0.3 Nm to 0.4 Nm. To achieve a threshold torque which is in the afore-mentioned range, the flat circular outer engagement surface of the adjustment ring and the flat inner surface of the at least one clamping block are specifically configured. Generally, the required clamping action is a result of the size of the contact area between the flat inner surface (of the at least one clamping block) and the flat circular outer engagement surface (of the adjustment ring) and of the clamping force acting on this contact area. Therefore, in principle the threshold torque can be achieved by different combinations of sizes of the contact area between the flat inner surface of the clamping block and the flat circular outer engagement surface (of the adjustment ring) and clamping forces, so that the person skilled in the art is able to select suitable geometries, sizes and clamping forces to achieve the predetermined threshold torque.

It is advantageous if the adapter piece comprises two clamping blocks which are symmetrically arranged at radially opposite sides of the flat circular outer surface of the adjustment ring, since this results in a symmetrical clamping action, although in general one such clamping block is sufficient (the opposite side of the flat circular outer surface would then be clamped by a structure of the adapter piece other than a clamping block). Advantageously, the flat inner clamping surface of each of the two oppositely arranged clamping blocks is also circular and extends in the circumferential direct (like the flat outer surface of the adjustment ring), and the curvature of the flat circular inner clamping surface of the clamping blocks corresponds to the curvature of the flat circular outer engagement surface of the adjustment ring. In addition, the inner diameter (measured) between the flat circular inner clamping surfaces of the two oppositely arranged clamping blocks is smaller than the outer diameter of the flat circular outer engagement surface of the adjustment ring. Thus, a press-fit is formed between the flat circular outer engagement surface of the adjustment ring and the flat circular inner clamping surfaces of the oppositely arranged clamping blocks. By way of example, the area of the flat circular inner clamping surface of each of the two clamping blocks is in the range of 15 mm² to 25 mm² and may in particular be about 20 mm². This area corresponds to the contact area between the flat circular inner clamping surfaces and the flat circular outer engagement surface of the adjustment ring. In some embodiments the flat circular inner clamping surfaces may additionally be provided with a chamfer at an axial end thereof, thus simplifying introduction of the adjustment ring which is firmly mounted to the sleeve between the flat circular inner clamping surface of the two clamping blocks during assembly of the mold unit. In case the adjustment ring is composed of two ring parts which are assembled in a form-locking manner this facilitates mounting of the adjustment ring to the sleeve.

Generally, there are a number of materials which are suitable for the clamping blocks and for the adjustment ring. By way of example, an advantageous material the clamping blocks may be made of is polyoxymethylene (POM) which is injection-moldable and has a high rigidity, stiffness and hardness and is resistant to wear. An advantageous material the adjustment ring may be made of is polyketone which is a high-performance thermoplastic polymer with stable mechanical properties and a high resistance to wear.

By way of example, the inner diameter between the flat circular inner surfaces of the two clamping blocks may be 0.6 mm-1.2 mm smaller than the outer diameter of the flat circular outer engagement surface of the adjustment ring. This provides for a suitable press-fit as described above.

As already mentioned, the lens mold may generally have a spherical lens molding surface, however, in this case the rotational adjustability of the sleeve (and the lens mold rigidly mounted thereto) is not relevant. Nevertheless the mold unit of the present invention may comprise such lens molds, too. On the other hand, it is particularly advantageous in connection with lens molds having a lens molding surface that is not rotationally symmetrical, in particular toric, as is explained above with respect to the arrangement of the lens mold at any desired angular position.

To rotate the sleeve, the sleeve may comprise engagement surfaces for an adjustment tool for rotating the sleeve to the respective desired angular position.

By way of example, the lens mold rigidly mounted to the sleeve may be a male mold having a toric lens molding surface. The contact lens produced with such male mold has a toric back surface. In such instance, the front surface of the contact lens typically has features for rotational stabilization of the contact lens, so that the lens molding surface of the female mold is not rotationally symmetrical. Such male mold may then be rotated such that the axes of the toric lens molding surface may be rotated to any desired angular position (relative to the lens molding surface of the female mold).

BRIEF DESCRIPTION OF THE DRAWINGS

Further advantageous aspect will become apparent from the following description of embodiments of the invention with the aid of the drawings in which:

FIG. 1 shows an embodiment of a lens mold carrier 1 comprising a frame 10 which extends in the x-y plane and comprises a plurality of individual compartments 100. As shown in FIG. 1, in each of the two foremost compartments 100 of frame 10 a mold unit 11 is floatingly arranged, that is to say the mold unit 11 is movable within the compartment 100 to some extent, at least in a plane parallel to the x-y plane in which lens mold carrier 1 extends. Mold unit 11 comprises an adapter piece 110 and a sleeve 111. A female lens mold 112 is rigidly mounted to the sleeve 111. Sleeve 111 is arranged in a central opening of the adapter piece 110. In the embodiment shown, sleeve 111 is fixedly mounted to adapter piece 110 and is not rotatable relative to adapter piece 110. Alternatively, however, sleeve 111 may be mounted to adapter piece 110 in a manner such that sleeve 111 (and female lens mold 112 rigidly connected thereto) may be rotatable relative to adapter piece 110.

Figure 1:
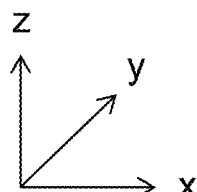
FIG. 1 shows a perspective view from above of a lens mold carrier with mold units comprising female lens molds (prior art)
Figure 2:
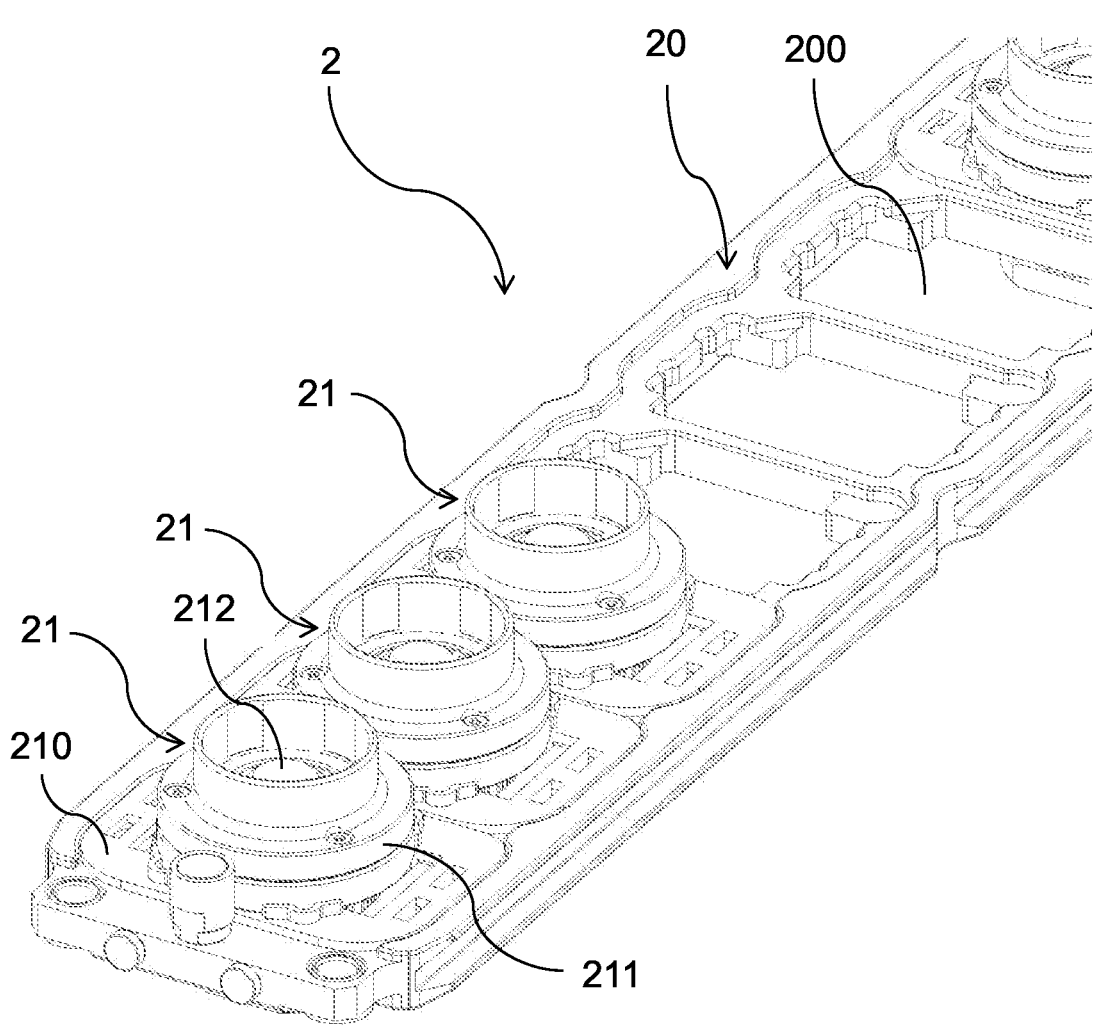
FIG. 2 shows a perspective view from above of a lens mold carrier with mold units comprising male lens molds.
Figure 2:
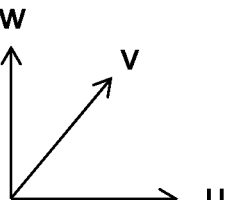
Figures 3, 4:
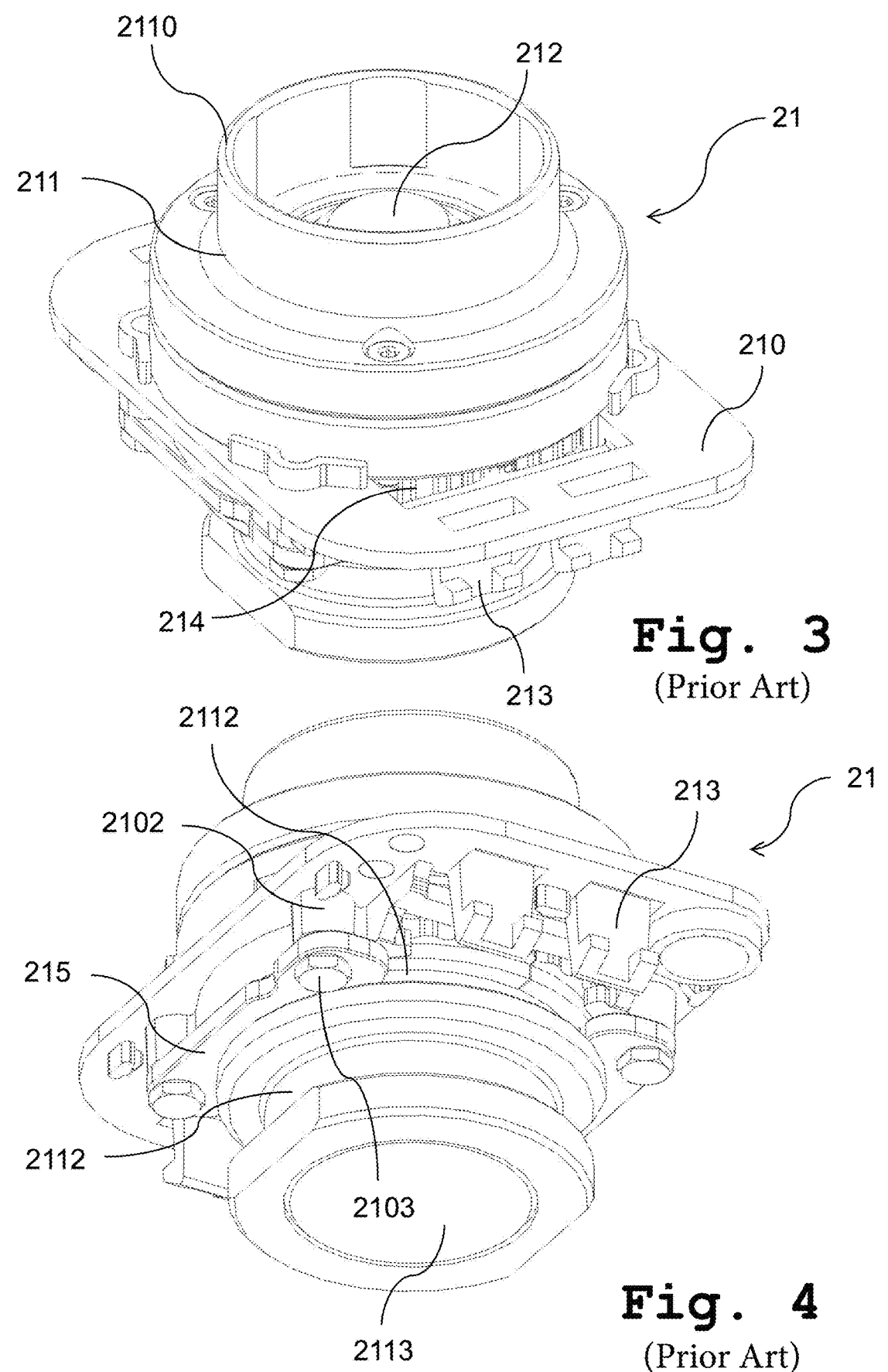
FIG. 3 shows a perspective view from above of one mold unit of the lens mold carrier shown in FIG. 2.
FIG. 4 shows a perspective view from below of the mold unit shown in FIG. 3.
Figures 5, 6:
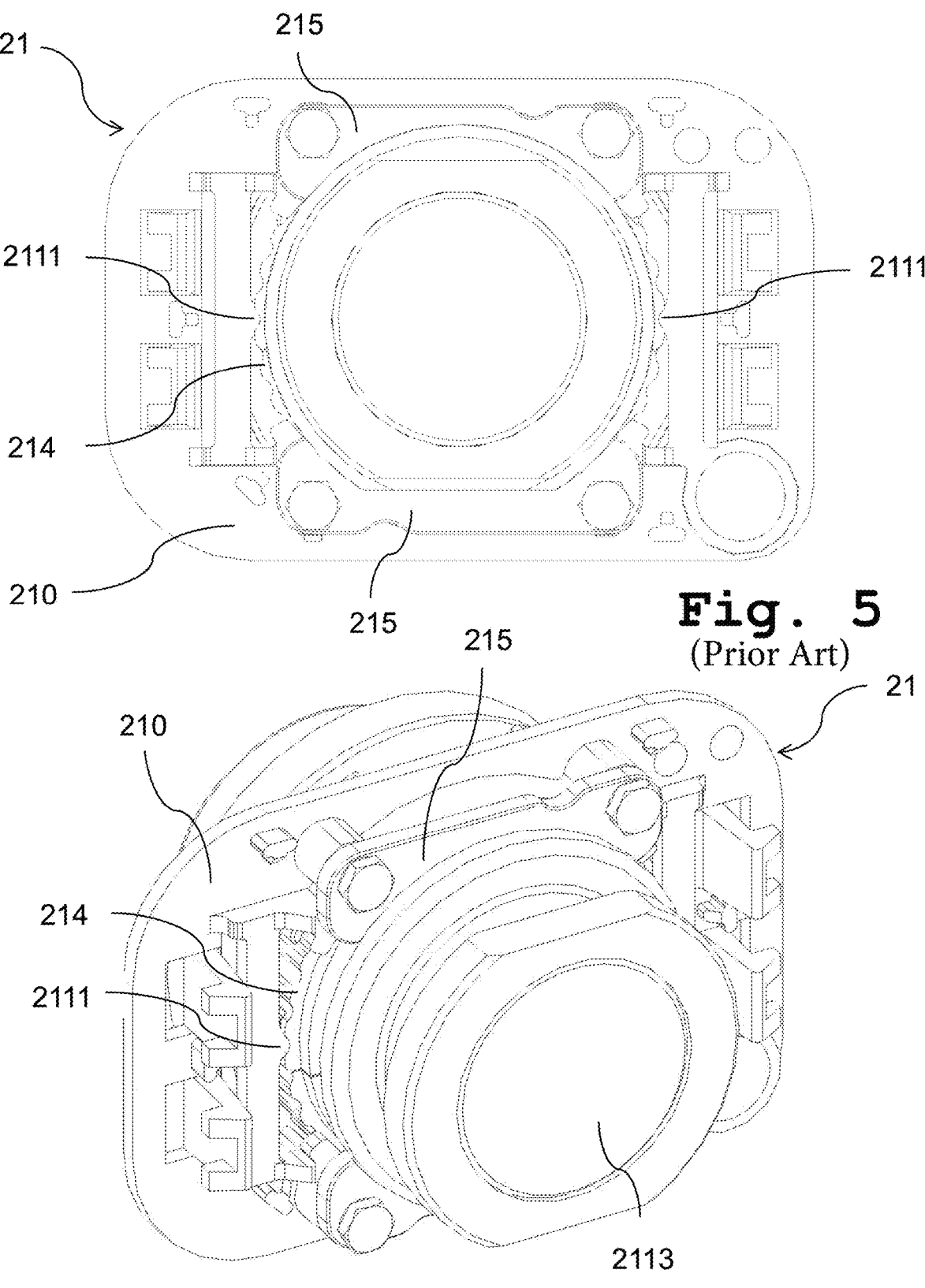
FIG. 5 shows a bottom view of the mold unit shown in FIG. 3.
FIG. 6 shows a further perspective view from below of the mold unit shown in FIG. 3.

Sleeve 111 has a generally cylindrical shape and axially extends beyond the female lens mold 112. The front end of sleeve 111 comprises a chamfered portion 1110 for engaging with a rounded front portion of the sleeve of a mold unit having a male lens mold rigidly mounted thereto (see further below), in order to facilitate the mating of the mold units comprising the male and female lens molds. So far the mold unit 11 comprising the female lens mold 112 corresponds to the mold unit 11 shown in FIGS. 1-4 of WO 2015/078798 where the mold unit 11 is described in more detail.

In FIG. 2, FIG. 3, FIG. 4, FIG. 5, FIG. 6 and FIG. 7, a lens mold carrier 2 or a mold unit 21 arranged in individual compartments 200 of the lens mold carrier 2 are shown. Lens mold carrier 2 comprises a frame 20 which extends in a u-v plane and comprises a plurality of the individual compartments 200. Again, in each of the foremost two compartments 200 of frame 20 a mold unit 21 is floatingly arranged, that is to say the mold unit 21 is movable within the compartment 200 to some extent, at least in the u-v plane in which lens mold carrier 2 extends. Mold unit 21 comprises an adapter piece 210 and a sleeve 211. A male lens mold 212 is rigidly mounted to the sleeve 211. Sleeve 211 is arranged in a central opening of the adapter piece 210.

Sleeve 211 is mounted to adapter piece 210 in a manner such that it is lockingly connected to adapter piece 210 at a fixed angular position, but can be rotated relative to adapter piece 210 to get lockingly engaged at other predetermined fixed angular positions, however, only at these predetermined fixed angular positions. As regards this aspect, the mold unit 21 of the invention (discussed in more detail) is fundamentally different from the mold unit 21 shown in FIGS. 2-7, as will be discussed further below. However, in many other aspects which are discussed in the following, the mold unit 21 of the invention may be embodied similar to the mold unit 21 shown in FIGS. 2-7 which are discussed in more detail in the following.

Figure 7:
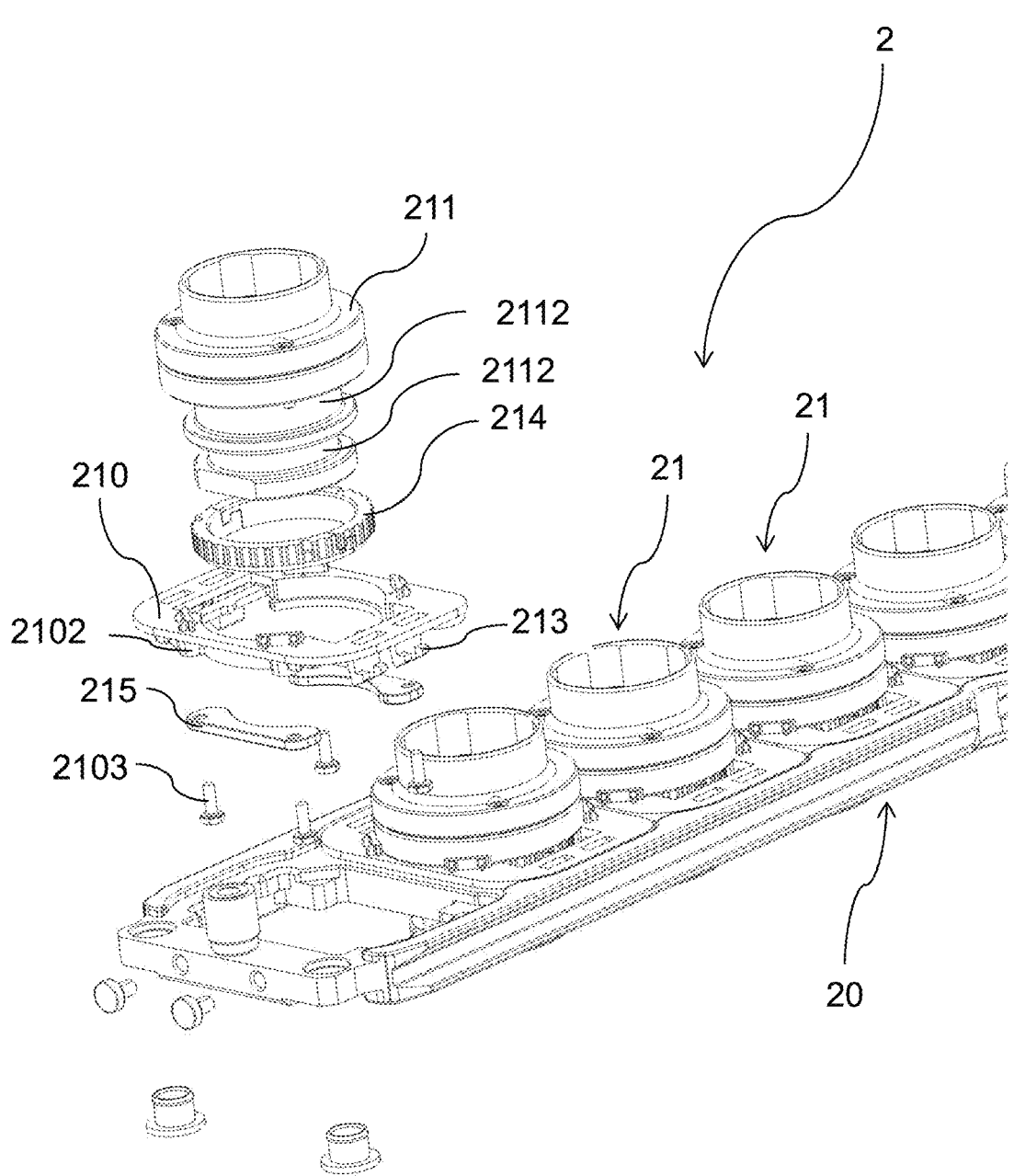
FIG. 7 shows a perspective view from above of the lens mold carrier of FIG. 2 with mold units being arranged in all compartments of the lens mold carrier, one mold unit being shown in an exploded view.

Sleeve 211 has a generally cylindrical shape (see FIG. 7). At its front end, sleeve 211 extends axially beyond male lens mold 212, and this front end of sleeve 211 of male mold unit 21 comprises a rounded portion 2110 for engaging with the chamfered portion 1110 of sleeve 111 of the female mold unit 11 (see FIG. 1) in order to facilitate mating of the male and female mold units.

Sleeve 211 comprises two circumferentially running grooves 2112. An adjustment ring 214 comprising two assembled ring pieces is arranged in one of these grooves 2112 as well as two fixation brackets 215 engaging into the same groove 2112 at opposite sides. The adjustment ring 214 shown in FIG. 2-7 is toothed, and in this regard the adjustment ring of the mold unit of the invention is fundamentally different.

Adjustment ring 214 is firmly attached to sleeve 211 so that it can be rotated only together with sleeve 211 relative to adapter piece 210 in a plane parallel to the u-v plane. However, due to adjustment ring 214 being toothed, a rotation of the adjustment ring is only possible between fixed angular positions, at which the toothed adjusting ring 214 form-lockingly engages with two fixedly arranged locking teeth 2111 provided on locking elements forming part of the adapter piece 210 (see FIG. 5), these two locking teeth 2111 being arranged at opposite sides. Thus, adjustment ring 214 is form-lockingly connected to the adapter piece 210 at fixed angular positions. In the production of toric contact lenses (here: contact lenses having a toric back surface) this allows to comparatively easily change the angular position of the axes of the (toric) male mold 212 through rotating adjustment ring 214 (and together with it mold unit 21 including male mold 212) by one or more fixed angular steps (valleys on the toothed adjustment ring 214) relative to adapter piece 210, and to then have it form-lockingly connected with the adapter piece 210 again at a different angular position via the locking teeth 2111 provided on the locking elements of the adapter piece 210. After such rotation and subsequent form-locking engagement at a different angular position, a toric contact lens with a different arrangement of the axes can be produced.

During mounting of sleeve 211 to adapter piece 210, sleeve 211 with adjustment ring 214 arranged in groove 2112 is moved through the central opening in adapter piece 210 (see FIG. 7). Sleeve 211 is then connected to adapter piece 210 with the aid of the two fixation brackets 215 also projecting into groove 2112. Each of the fixation brackets 215 is fixedly mounted to two posts 2102 projecting from the rear face of adapter piece 210 with the aid of screws 2103. Sleeve 211 is thereby secured against axial movement. Once the fixation brackets 215 are screwed to posts 2102 and extend into the circumferentially running groove 2112 at opposite sides and the teeth 21112110 are form-lockingly engaged with the toothed adjustment ring 214, sleeve 211 is fixedly connected to adapter piece 210 (see FIG. 4). At its rear end, sleeve 211 is provided with a centrally arranged glass disk 2113 allowing UV-light to pass through to the mold for curing the lens forming material, as this is well-known in the art.

Adapter piece 210 further comprises two pairs of resilient latches 213. In order to securely mount mold unit 21 to one of the compartments 200 of frame 20, mold unit 21 is pressed from above into compartment 200 until the resilient latches 213 of adapter piece 210 snap beneath and engage the compartment walls of frame 20. Once this engagement has occurred, male mold unit 21 is secured in the respective compartment 200 against falling out of the compartment 200, since the resilient latches 213 prevent the adapter piece 210 (and thus the entire male mold unit 21) from inadvertently falling out of the compartment 200 of frame 20. However, although male mold unit 21 is arranged in compartment 200 in a manner secured against falling out, limited movement of the adapter piece 210 is still possible within compartment 200 both in a translation plane (which is a plane parallel to or coincident with the u-v plane) as well as in a direction (w-direction) perpendicular thereto.

As is evident, the movement of adapter piece 210 (and thus of male mold unit 21) within compartment 200 in w-direction is limited by the resilient latches 213. Movement of the adapter piece 210 in the translation plane is limited by six abutment posts arranged on the rear face of adapter piece 210 and projecting therefrom, with one of the abutment posts that one in the lower left corner in FIG. 5—being arranged in a specific manner to allow mounting of adapter piece 210 to compartment 200 only in one orientation (the correct orientation). The limited movement of adapter piece 210 within compartment 200 in the translation plane may amount up to 0.3 mm in the u-direction and up to 0.3 mm in the v-direction (in each of the positive and negative u- or v-direction, respectively; i.e. ±0.3 mm). So far, the mold unit is known from WO 2015/078798 A1. The mold unit according to the instant invention, however, is different from this mold unit in some significant aspects, as is discussed in the following.

In FIGS. 8-20 an embodiment of the mold unit according to the invention as well as individual components thereof are shown in more detail. As many components of the embodiment of the mold unit according to the invention are identical or highly similar to those described above with the aid of FIGS. 2-7, the reference signs assigned to components which are similar to those used in FIGS. 2-7 are similar to those used in FIGS. 2-7. The general difference is that the leading numbers used in FIGS. 8-20 are "22" instead of "21". As regards the lens mold carrier 2, the reference signs remain unchanged, as the carrier 2 is not the subject of this invention.

Figures 19, 20:
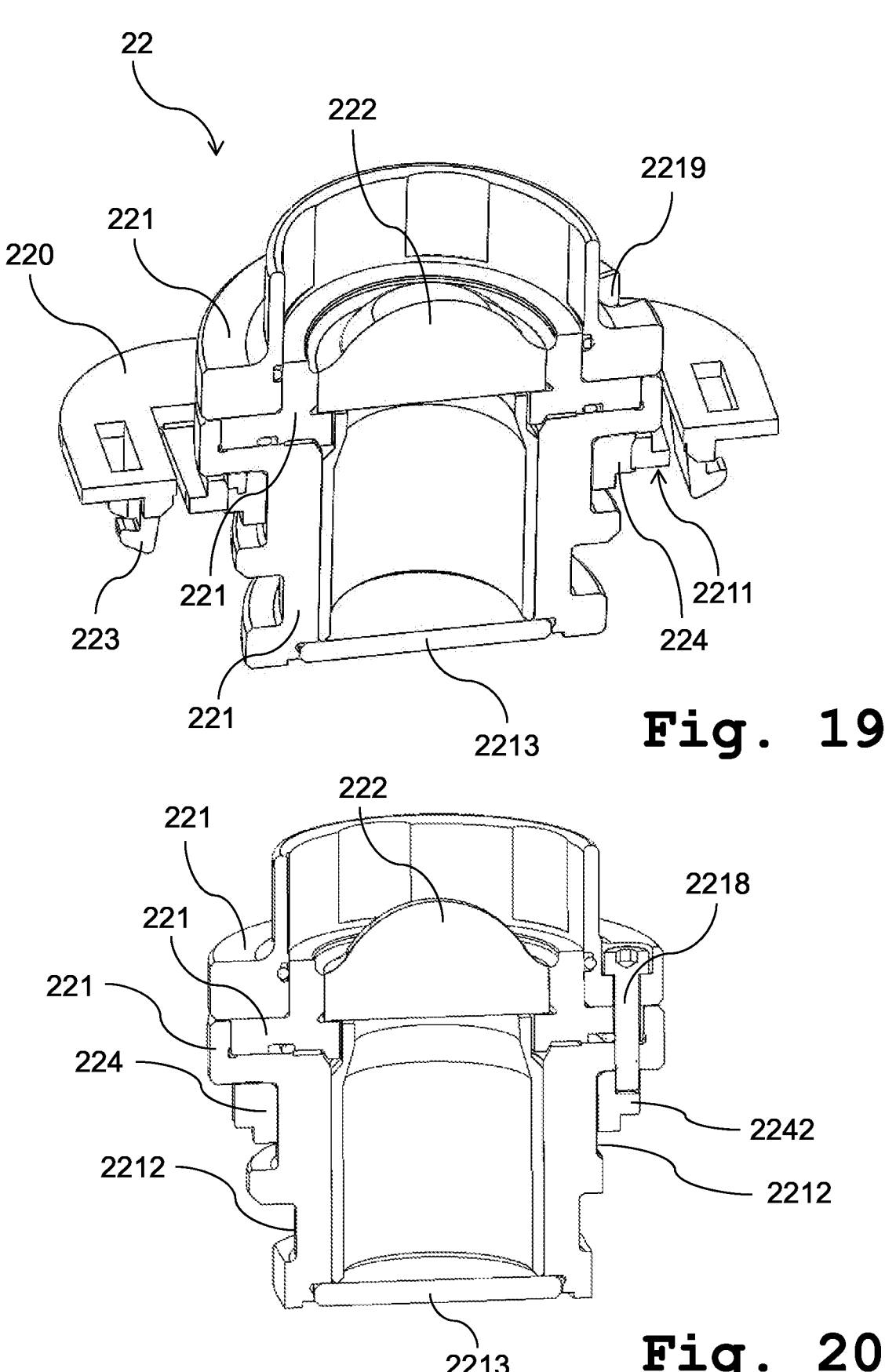
FIG. 19 shows a perspective sectional view of the sleeve with the adjustment ring of FIG. 10 firmly attached thereto arranged in the adapter piece.
FIG. 20 shows a perspective sectional view of the sleeve with the adjustment ring of FIG. 10 firmly attached thereto (without the adapter piece).

Accordingly, mold unit 22 comprises an adapter piece 220 (shown in more detail in FIG. 13-FIG. 15) for insertion into a compartment 200 of a lens mold carrier 2. Adapter piece 220 comprises an opening 2200 extending around a longitudinal axis 2201. Mold unit 22 further comprises a sleeve 221 (see in more detail in FIG. 19 and FIG. 20) that is fixedly connected to adapter piece 220, although being rotatable relative thereto upon the application of a torque higher than a predetermined threshold torque as is discussed further below. A male lens mold 222, for example a male lens mold 222 having a toric lens molding surface, is rigidly mounted to sleeve 221. Sleeve 221 comprises several sleeve pieces including the upper sleeve piece visible in FIG. 8, but also comprises a sleeve piece to which male lens mold 222 is rigidly mounted as well as a lower sleeve piece to which the glass disk 2213 is mounted through which UV-light may impinge on the lens-forming material contained in the mold cavity formed between the male and female molds to cure the lens-forming material, as can be seen in FIG. 19 and FIG. 20.

Adapter piece 220 further comprises two clamping blocks 2211 (see FIG. 13 and FIG. 14) each having a (circularly) curved flat inner clamping surface 2214 for engagement with a correspondingly (circularly) curved flat outer engagement surface 2244 of an adjustment ring 224 (see FIG. 10-FIG. 12) firmly attached to the sleeve 221. The area of each of the two curved flat inner clamping surfaces 2214 is in the range of 15 mm$^2$-25 mm$^2$, and in particular is about 20 mm$^2$. By way of example (and without being limited thereto), the clamping blocks 2211 may be made of polyoxymethylene, and even the adapter piece 220 as a whole may be made of this material to allow for manufacture of the adapter piece 220 using injection molding techniques.

Figures 16, 17, 18:
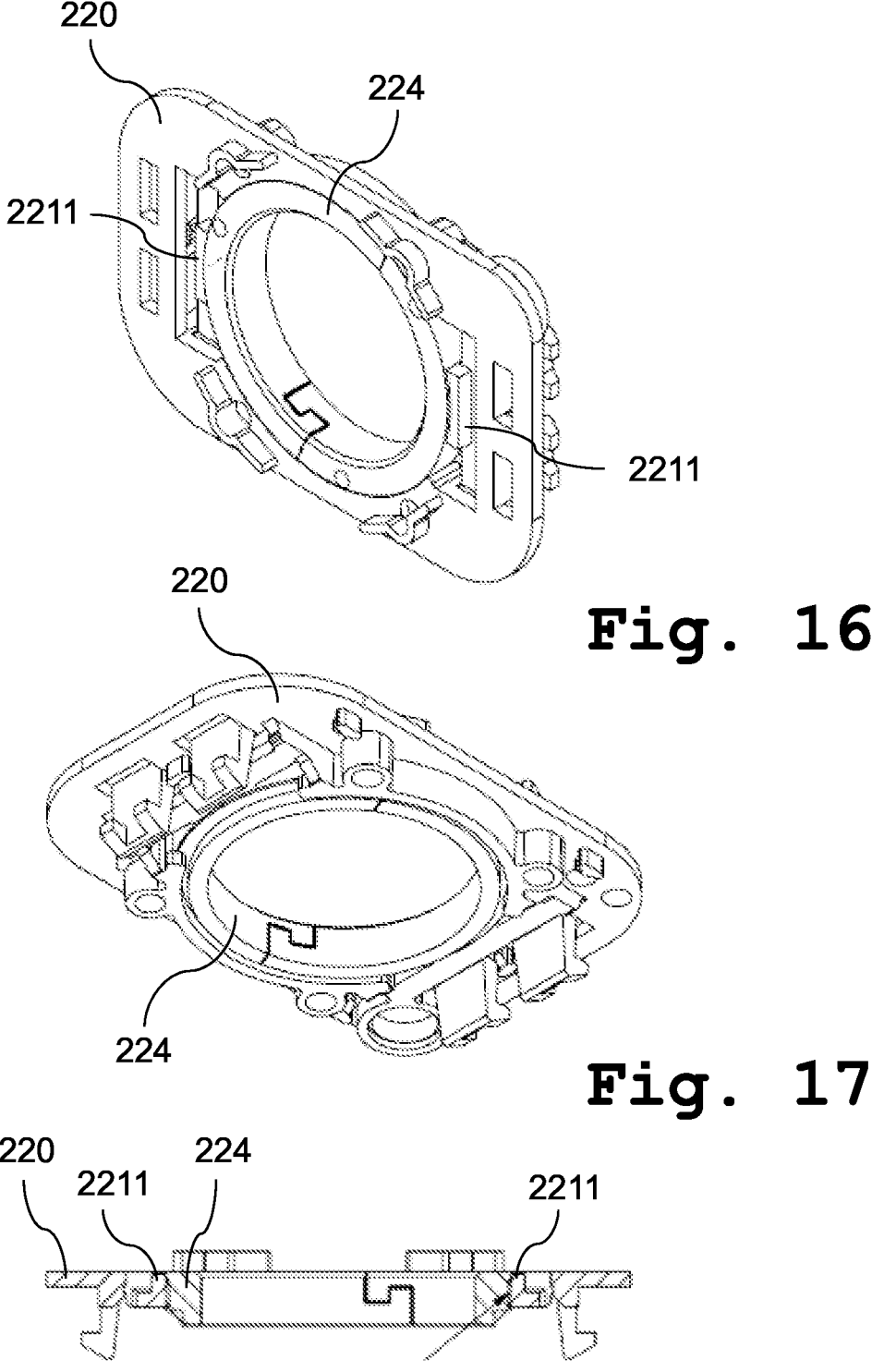
FIG. 16 shows a perspective view from above of the adapter piece of FIG. 13, with the adjustment ring of FIG. 10 mounted thereto.
FIG. 17 shows a perspective view from below of the adapter piece shown in FIG. 13, with the adjustment ring of FIG. 10 mounted thereto.
FIG. 18 shows a sectional view of the adapter piece shown in FIG. 13, with the adjustment ring of FIG. 10 mounted thereto.

The two clamping blocks 2211 are oppositely arranged relative to the longitudinal axis 2201 (see FIG. 13), and their curved flat inner clamping surfaces 2214 are facing radially inwardly towards the curved flat outer engagement surface 2244 of adjustment ring 224 when the sleeve 221 with the adjustment ring 224 firmly attached thereto is connected to the adapter piece 220 (see FIG. 16-FIG. 18). Each of the clamping blocks 2211 further comprises an upper chamfered portion 2216 (see FIG. 13) to simplify insertion and centration of the sleeve 221 with adjustment ring 224 firmly attached thereto. As can be seen best in FIG. 14, an inner diameter 2215 extends between the two curved flat inner clamping surface 2214 of clamping blocks 2211.

Figures 13, 14, 15:
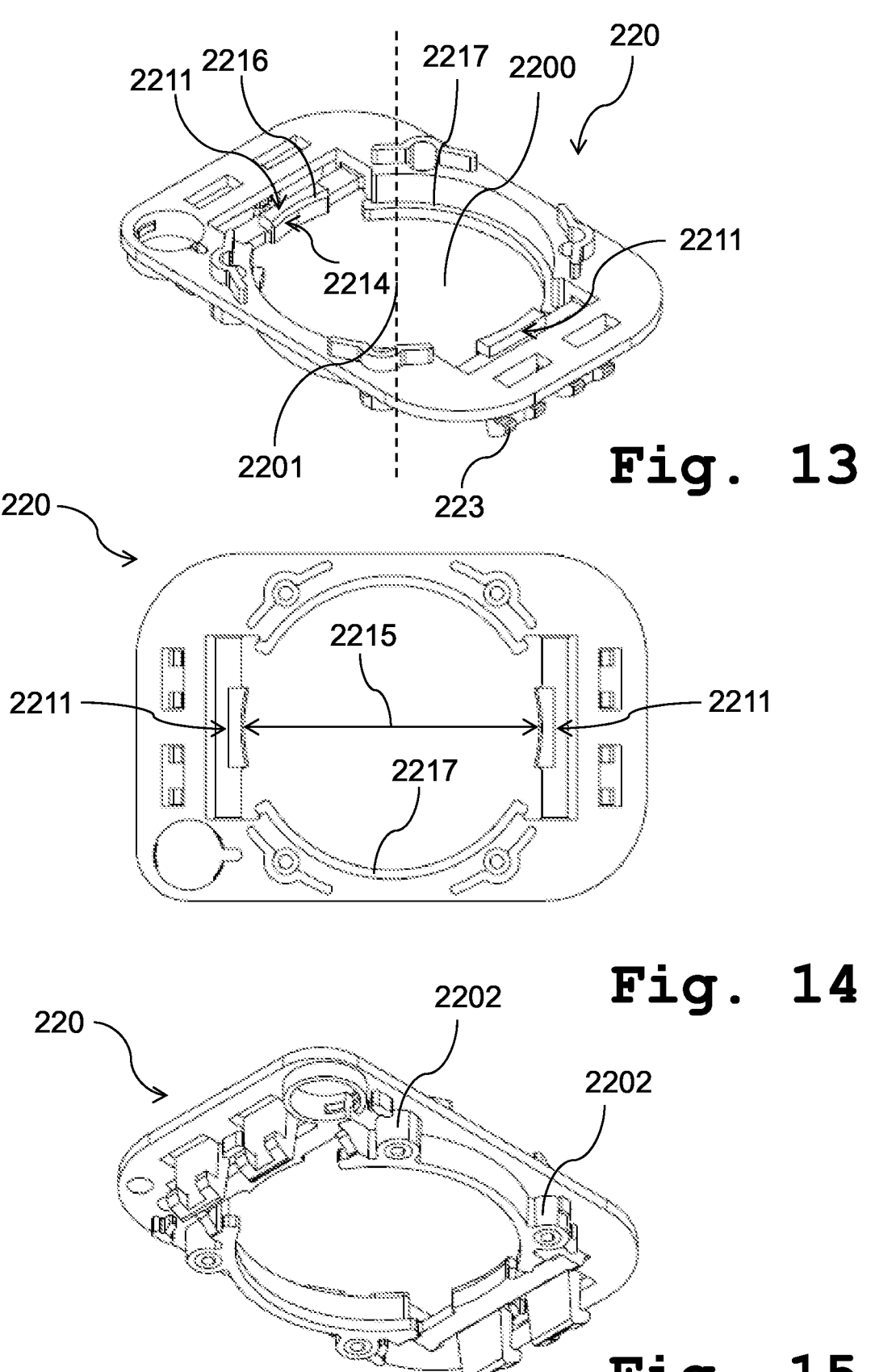
FIG. 13 shows a perspective view from above of the adapter piece of the mold unit shown in FIG. 8.
FIG. 14 shows a top view of the adapter piece shown in FIG. 13.
FIG. 15 shows a perspective view from below of the adapter piece shown in FIG. 13.

As can be seen further in FIG. 13-FIG. 15, the wall partially surrounding opening 2200 in portions other than those portions where the clamping blocks 2211 are arranged has a stepped profile. The step 2217 can be seen best in FIG. 13 and FIG. 14. Adapter piece 220 further comprises latches 223 allowing adapter piece 220 to be snapped into a respective compartment 200 of carrier 2, similar to the manner already explained above. Also, adapter piece comprises mounting posts 2202 (see FIG. 8 and FIG. 15) to which brackets 225 can be mounted with the aid of screws 2203 (FIG. 8), and these brackets 225 project into groove 2212 (see FIG. 20) of sleeve 221 to secure the sleeve 221 against axial movement, similar to how this is explained further above.

Figures 10, 11, 12:
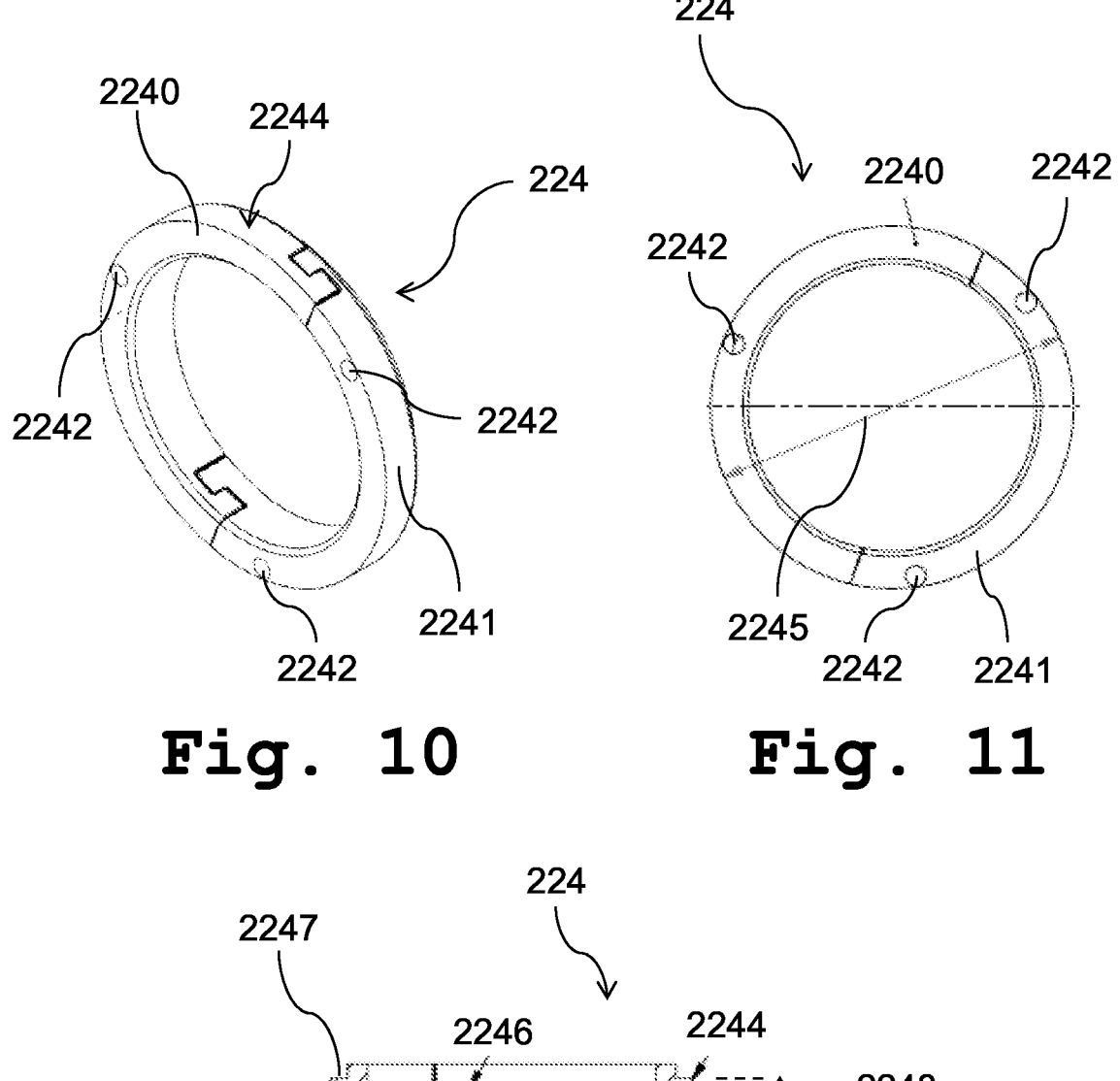
FIG. 10 shows a perspective view of the adjustment ring of the embodiment of the mold unit shown in FIG. 8.
FIG. 11 shows a top view of the adjustment ring shown in FIG. 10.
FIG. 12 shows a sectional view of the adjustment ring shown in FIG. 10.

Adjustment ring 224 has a circular shape and comprises two ring parts 2240 and 2241 (see FIG. 10-FIG. 12) which are assembled in a form-locked manner as shown at the connection location 2246 in FIG. 12. Upon being form-locked the two ring parts 2240 and 2241 may not be shifted relative to one another in the circumferential direction and, although not visible, they may not be shifted relative to one another in the radial direction either. As can be seen best in FIG. 11, the curved flat outer engagement surface 2244 of adjustment ring 224 has an outer diameter 2245.

Figures 8, 9:
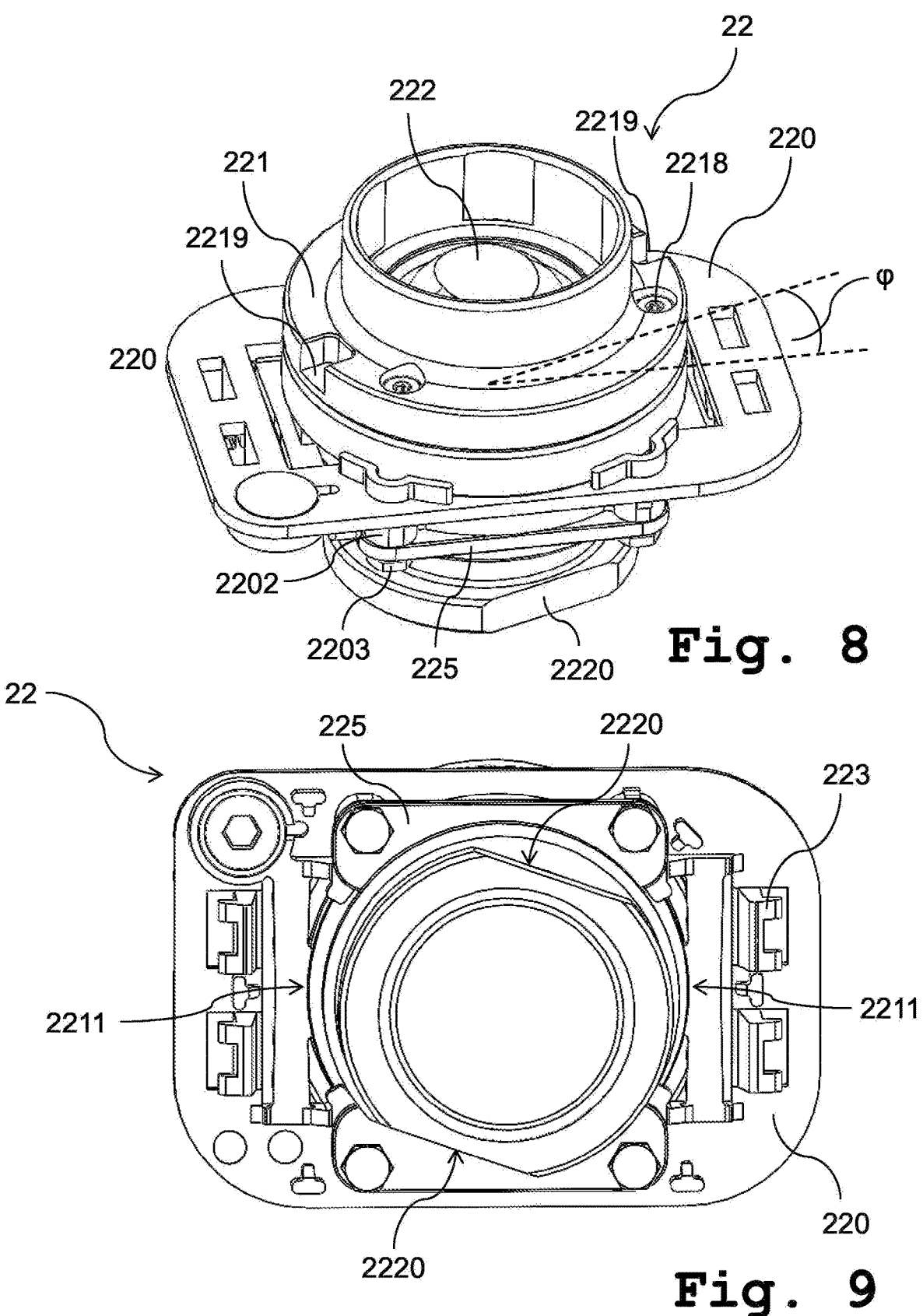
FIG. 8 shows a perspective view from above of an embodiment of the mold unit according to the invention.
FIG. 9 shows a perspective view from below of the embodiment of the mold unit shown in FIG. 8.

Adjustment ring 224 further comprises a plurality of blind holes 2242 (in the embodiment shown three such blind holes 2242), the purpose of which is to allow for a firm connection of adjustment ring 224 to sleeve 221 with the aid of screws 2218 (see FIG. 8 and FIG. 20). As can be seen best in FIG. 20, the outer thread of a screw 2218 that engages with a corresponding inner thread in the lower piece of sleeve 221, and the shaft of screw 2218 further extends into the blind hole 2242 of adjustment ring 224 and forms a firm connection with the plastics of the walls surrounding the blind hole 2242.

As can be seen best in FIG. 12 where adjustment ring 224 is shown upside down, adjustment ring 224 also comprises a stepped profile, with the step 2247 being visible. This step 2247 of adjustment ring 224 comes to rest on step 2217 formed in the stepped wall portions surrounding the opening 2200 of adapter piece 220 once sleeve 221 has been connected to adapter piece 220. The axial length 2248 of the curved flat outer engagement surface 2244 of adjustment ring 224 is equal to or greater than the axial length of the curved flat inner clamping surface 2214 of the clamping blocks 2211 of adapter piece 220.

By way of example (and without being limited thereto), adjustment ring 224 (both ring parts 2240 and 2241) may be made of polyketone which is an injection-moldable high performance polymer that is mechanically stable and has a high resistance to wear. This material may be advantageously used in case the clamping blocks 2211 or the adapter piece 220 as a whole is made of polyoxymethylene.

In order to explain the mode of operation, FIG. 16-FIG. 18 show the adjustment ring 224 shown in FIG. 10-FIG. 12 connected to the adapter piece 220 shown in FIG. 13-FIG. 15 (i.e. without sleeve 221 being shown), although in practice the adjustment ring 224 is firmly attached to the sleeve 221 first, and only then the sleeve 221 together with the adjustment ring is connected to the adapter piece 220.

As can be seen best in FIG. 16 and FIG. 18 (see the unlabeled arrow in FIG. 18), the outer engagement surface 2244 of adjustment ring 224 is clamped by the inner clamping surfaces 2214 of the clamping blocks 2211, while the step 2247 of adjustment ring 224 rests on the step 2217 of adapter piece 220. The clamping action is a consequence of the fact that the inner diameter 2215 between the oppositely arranged inner clamping surfaces 2214 of the clamping blocks 2211 is smaller than the outer diameter 2245 of the curved flat outer engagement surface 2244 of adjustment ring 224. Thus, adjustment ring 224 is frictionally clamped by the oppositely arranged clamping blocks 2211.

A reliable clamping of adjustment ring 224 (and thus of the sleeve 221 with the mold 222 rigidly mounted thereto, see FIG. 19) may be achieved, by way of example, when the inner diameter 2215 between the curved flat inner clamping surfaces 2214 of the oppositely arranged clamping blocks 2211 (see FIG. 15) is 0.6 mm-1.2 mm, in particular about 0.9 mm, smaller than the outer diameter 2245 of the curved flat outer engagement surface 2244 of adjustment ring 224, especially when the inner clamping surfaces 2214 have the afore-described size of 15 mm$^2$-25 mm$^2$ and the afore-described materials (i.e. polyoxymethylene and polyketone) are used for the clamping blocks 2211 and the adjustment ring 224.

To assemble the mold unit 22, the sleeve 221 with the male mold 222 rigidly mounted thereto and with adjustment ring 224 firmly attached to the sleeve 221 with the aid of the screws 2218 (see FIG. 20) is mounted to adapter piece 221 by pushing it from above through the opening 2200 of adapter piece 221 until the outer engagement surface 2244 of adjustment ring 224 comes into clamping engagement with the inner clamping surface 2214 of the clamping blocks 2211, and until step 2247 of adjustment ring 224 comes to rest on step 2217 of the wall surrounding the opening 2200 of adapter piece 220. Thereafter, brackets 225 are screwed to posts 2202 (see FIG. 8) whereupon sleeve 221 is secured against axial movement relative to adapter piece 220.

Turning back to FIG. 8, sleeve 221 comprises two oppositely arranged notches 2219 in the upper piece of sleeve 221, and two parallel flat surfaces 2220 arranged at the lower end of the lower piece of sleeve 221. The direction of the two parallel flat engagement surfaces 2220 is identical with the direction of a (virtual) straight line connecting the two oppositely arranged notches 2219. Although not mandatory, the arrangement of the notches 2219 and of the parallel flat engagement surfaces 2220 may be such that they are indicative of the direction of the major axis of the toric molding surface of male mold 222 (the minor axis of the toric molding surface is normally perpendicular to this major axis). This allows, for example, for an automatic determination of the angular position of the direction of the major axis of the toric molding surface of male mold 222 by means of a camera.

Let us now assume that sleeve 221 is mounted to adapter piece 220 at an angular position relative to adapter piece 220 represented by the upper dashed line of azimuthal angle φ (e.g. φ=) 20° shown in FIG. 8, with male mold 222 having a toric molding surface. As a toric contact lens must be arranged in a rotationally stabilized position on the eye, the front surface of the toric contact lens (determined by the female mold, not shown) typically comprises stabilization features (e.g. prism ballast or slab-off zones). Therefore, the front surface of a toric contact lens is not rotationally symmetrical, either. Let us further assume that the female mold (not shown) is arranged such that the horizontal meridian of the molding surface of the female mold coincides with the lower dashed line of the angle. Thus, a toric contact lens is produced having a back surface the major axis of which is arranged at an angle φ=20°, and this is possible due to the adjustment ring 224 firmly attached to the sleeve 221 being reliably clamped by the clamping blocks 2211 of adapter piece 220.

In case a toric contact lens is to be produced having the major axis of the toric back surface arranged at an angle different from 20°, this is generally possible at any desired angle φ. However, to change the angle φ it is required to rotate toric male mold 222 (which is rigidly mounted to sleeve 221) to the desired angular position. Due to adjustment ring 224 being clamped by clamping blocks 2211—as has been explained above-rotation of the sleeve 221 (with toric male mold 222 rigidly mounted thereto) is only possible upon the application of a torque to sleeve 221 which is higher than a predetermined threshold torque, as the applied torque must overcome the frictional clamping forces between the inner clamping surfaces 2214 of the clamping blocks 2211 and the outer engagement surface 2244 of adjustment ring 224. A suitable predetermined threshold torque may be in the range of 0.3 Nm-0.6 Nm (Newton meters), and may in particular be in the range of 0.3 Nm-0.4 Nm.

A suitable rotational driving tool (not shown), such as a rotary motor having a shaft to which a suitable engagement tool is mounted, may engage the two parallel flat engagement surfaces 2220 of the lower piece of sleeve 221 and rotate sleeve 221 to the desired new angular position by applying a torque to the sleeve 221 which is higher than the afore-mentioned predetermined threshold torque. For example, to rotate sleeve 221 (and toric male mold 222 rigidly mounted thereto) to a desired new angular position at φ=35°, the rotational drive would rotate sleeve 221 by 15° (35°-20°=) 15° in the counterclockwise direction (FIG. 8). It is noteworthy in this regard, that any rotational drive includes a (smaller or larger) angular play. This means that for a precise adjustment of the desired new angular position the rotational drive should always be rotated in the same direction. For example, in case the angular position is at an angle of φ=20° and should be changed to an angle of φ=15°, the rotational drive should rotate sleeve 221 by an angle of 355° in the counterclockwise direction (FIG. 8) rather than rotating sleeve 221 by 5° in the clockwise direction, as in the latter case the angular play of the rotational drive may result in an inaccurate setting of sleeve 221 at the new angular position. Alternatively, a suitable engagement tool may engage into the notches 2219 and rotate sleeve 221 to the desired angular position. Once sleeve 221 has been rotated to the desired new angular position, due to the clamping forces between the clamping blocks 2211 and the adjustment ring 224, toric contact lenses having the new desired angular position of the major axis can be reliably produced.

The invention has been described with the aid of embodiments. However, the invention is not limited to these embodiments but rather the person skilled in the art knows that many changes or modifications are conceivable without departing from the teaching underlying the present invention. For example, as both the front surface and the back surface of the contact lens to be produced are not rotationally symmetrical, it is also possible to rotate the mold unit comprising the female mold while not rotating the mold unit comprising the male mold. Also, both mold units may be rotated so as to be finally arranged at the desired new angular position. Therefore, the scope of protection is not limited to the embodiments shown and described but is defined by the appended claims.

The invention claimed is:

1. Mold unit (22) for molding ophthalmic lenses, the mold unit (22) comprising:
    an adapter piece (220) for insertion into a compartment (20) of a lens mold carrier (2), the adapter piece comprising an opening (2200) extending around a longitudinal axis (2201);
    a sleeve (221) fixedly connected to the adapter piece (220) and extending along the longitudinal axis (2201) through the opening (2200) of the adapter piece (220);
    a lens mold (222) rigidly mounted to the sleeve (221);
    an adjustment ring (224) firmly attached to the sleeve (221) and mounted to the sleeve (221) in a manner such as to circumferentially surround a portion of the sleeve (221);
wherein the adjustment ring (224) comprises a circularly curved smooth non-toothed outer engagement surface (2244) facing radially outwardly and extending in a circumferential direction around the sleeve (221), and wherein the adapter piece (220) comprises at least one clamping block (2211) having a circularly curved smooth non-toothed inner clamping surface (2214) facing radially inwardly towards the circularly curved smooth non-toothed outer engagement surface (2244) of the adjustment ring (224), the at least one clamping block (2211) being arranged such that the circularly curved smooth non-toothed inner clamping surface (2214) of the clamping block (2211) frictionally clamps the circularly curved smooth non-toothed outer engagement surface (2244) of the adjustment ring (224) so as to prevent inadvertent rotation of the sleeve (221) relative to the adapter piece (220) but to allow rotation of the sleeve (221) relative to the adapter piece (220) upon the application of a torque to the sleeve (221) which is higher than a predetermined threshold torque in the range of 0.3 Nm to 0.6 Nm.

2. Mold unit according to claim 1, wherein the adapter piece (220) comprises two clamping blocks (2211), each of the two clamping blocks (2211) having the circularly curved smooth non-toothed inner clamping surface (2214) facing radially inwardly towards the circularly curved smooth non-toothed outer engagement surface (2244) of the adjustment ring (224), the two clamping blocks (2211) being symmetrically arranged relative to the longitudinal axis (2201) at radially opposite sides of a circularly curved smooth non-toothed outer surface adjustment ring (224).

3. Mold unit according to claim 2, wherein the circularly curved smooth non-toothed inner clamping surface (2214) of each of the two clamping blocks (2211) is circular and extends in the circumferential direction, with a curvature of the circularly curved smooth non-toothed inner clamping surface (2214) of each of the two clamping blocks (2211) corresponding to the curvature of the circularly curved smooth non-toothed outer engagement surface (2244) of the adjustment ring (224), and wherein an inner diameter (2215) between the circularly curved smooth non-toothed inner clamping surfaces (2214) of each of the two clamping blocks (2211) is smaller than an outer diameter (2245) of the circularly curved smooth non-toothed outer engagement surface (2244) of the adjustment ring (224).

4. Mold unit according to claim 3, wherein the area of the circularly curved smooth non-toothed inner clamping surface (2214) of each of the two clamping blocks (2211) is in the range of 15 mm$^2$ to 25 mm$^2$.

5. Mold unit according to claim 1, wherein the adjustment ring (224) is composed of two ring parts (2240, 2241) which are assembled in a form-locked manner to form the adjustment ring (224).

6. Mold unit according to claim 3, wherein the circularly curved smooth non-toothed inner clamping surfaces (2214) are provided with a chamfer (2216) at an axial end thereof for simplifying introduction of the adjustment ring (224) firmly mounted to the sleeve (221) between the circularly curved smooth non-toothed inner clamping surfaces (2214) of the two clamping blocks (2211) during assembly of the mold unit.

7. Mold unit according to claim 3, wherein the clamping blocks (2211) are made of polyoxymethylene, and wherein the adjustment ring (224) is made of polyketone.

8. Mold unit according to claim 3, wherein the inner diameter (2215) between the circularly curved smooth non-toothed inner clamping surfaces (2214) of the two clamping blocks (2211) is 0.6 mm-1.2 mm smaller than the outer diameter (2245) of the circularly curved smooth non-toothed outer engagement surface (2244) of the adjustment ring (224).

9. Mold unit according to claim 1, wherein the lens mold (222) has a lens molding surface that is not rotationally symmetrical.

10. Mold unit according to claim 1, wherein the sleeve (221) comprises engagement surfaces (2220) for an adjustment tool for rotating the sleeve (221) in the circumferential direction to a desired angular position.

11. Mold unit according to claim 1, wherein the lens mold (222) rigidly mounted to the sleeve (221) is a male mold having a toric lens molding surface.

* * * * *